United States Patent
Keith et al.

(10) Patent No.: US 7,040,158 B1
(45) Date of Patent: May 9, 2006

(54) METHOD FOR DETERMINING LOCAL INNER AND OUTER BOUNDARY LAYER LENGTH SCALES FROM DRAG MEASUREMENTS IN HIGH REYNOLDS NUMBER TURBULENT FLOWS

(75) Inventors: William L. Keith, Ashaway, RI (US); Kimberly M. Cipolla, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/015,805

(22) Filed: Dec. 20, 2004

(51) Int. Cl.
*G01P 13/00* (2006.01)

(52) U.S. Cl. .................................. 73/170.33
(58) Field of Classification Search ............. 73/170.33; 367/131, 187
See application file for complete search history.

(56) References Cited

U.S. PATENT DOCUMENTS

| | | | |
|---|---|---|---|
| 3,901,076 A | 8/1975 | Grayson | |
| 4,122,711 A | 10/1978 | Irwin | |
| 4,796,238 A * | 1/1989 | Bourgeois et al. | 367/87 |
| 5,007,286 A | 4/1991 | Malcolm et al. | |
| 5,046,359 A * | 9/1991 | Layport | 73/170.33 |
| 5,191,790 A * | 3/1993 | Layport | 73/170.33 |
| 5,642,330 A * | 6/1997 | Santopietro | 367/131 |
| 6,591,222 B1 | 7/2003 | Stiner | |

* cited by examiner

*Primary Examiner*—Jewel V. Thompson
(74) *Attorney, Agent, or Firm*—Michael P. Stanley; James M. Kasischke; Jean-Paul A. Nasser

(57) ABSTRACT

A method is presented for determining inner and outer boundary layer length scales from a succession of drag measurements of a cylindrical body in order to estimate flow noise and for computational modeling of the dynamics of towed arrays in a fluid medium. A succession of measurements of the total drag on a cylinder under tow at uniform known conditions (flow speed, fluid density, fluid viscosity, cylindrical body geometry) is taken. After each measurement, the cylinder is truncated by a fixed amount, and the process is repeated for the length of the cylinder. The measurements provide a spatially and temporally averaged measure of the mean wall shear stress and momentum thickness, from which the inner and outer length scales can be determined. The inner and outer boundary layer length scales may then be used for estimation of flow noise on towed cylindrical bodies and arrays.

8 Claims, 1 Drawing Sheet

METHOD FOR DETERMINING LOCAL INNER AND OUTER BOUNDARY LAYER LENGTH SCALES FROM DRAG MEASUREMENTS IN HIGH REYNOLDS NUMBER TURBULENT FLOWS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

The present invention generally relates to the estimation of the flow noise on a cylindrical body in a turbulent flow and, more particularly, to a method for determining inner and outer boundary layer length scales from a succession of drag measurements of a long thin cylindrical body in any fluid as a precursor to estimating flow noise.

2. Description of the Prior Art

There is a significant practical need to know the drag and flow noise of towed long thin cylindrical bodies. The need arises in a variety of contexts including torpedoes and towed sonar arrays.

Towed sonar arrays are sonar systems that are designed to be towed by a submarine or a surface vessel in order to detect other submarines. The arrays are typically long, hose-like structures measuring up to a thousand feet or longer that contain specially designed acoustic sensors, called hydrophones, which receive acoustic waves. The arrays include electronics that convert the acoustical waves from analog to digital form and transmit that data to electronic processors on board the towing vessel.

The processor must distinguish radiated sound from other submarines from ambient and self noise, which includes the flow noise of the towed array. Thus, it is important to accurately estimate flow noise in advance, for design purposes. Moreover, towed arrays must be designed to withstand the extreme environmental stresses of operation in the ocean depths, and so it is necessary to accurately estimate drag, and estimate the local wall shear stress as well. Accomplishing this requires an understanding of the turbulent boundary layers which exist on the arrays.

The inner region of the boundary layer is dominated by viscous effects, and the outer region is dominated by inertial effects. Two dimensional flat plate turbulent boundary layers have been explored thoroughly for several decades, and it is generally accepted that the (inner) viscous length scale and the (outer) boundary layer momentum thickness scale adequately characterize the flow.

Most practical engineering flows, however, are characterized as high-Reynolds number flows. Since the viscous length scale decreases rapidly with increasing Reynolds number, and the outer length scales are only a weak function of Reynolds number, the inner and outer scales become increasingly disparate with increasing Reynolds number. Thus, more complex turbulent flows are often not well described by the Reynolds number alone, and must be described using inner and outer boundary layer length scales.

In the context of a towed array, the hydrodynamic flow is a high Reynolds number turbulent boundary layer, which may be equilibrium or nonequilibrium depending on the ship motion. Consequently, it is necessary to know the inner and outer boundary layer length scales, which characterize the flow field, for estimation of flow noise on long thin cylinders, and in particular, current and next generation towed sonar arrays.

Currently there are no viable approaches for determining the inner and outer boundary layer length scales in tow tank testing or full scale sea trials. Laser Doppler Velocimetry (LDV) and Particle Image Velocimetry (PIV) have been used extensively for measurements of turbulence in laboratories. However, oceanic field applications are impractical. It would be greatly advantageous to provide a method for determining inner and outer boundary layer length scales and, more particularly, from a succession of drag measurements of a long thin cylindrical body, in order to estimate flow noise and for improved computational modeling of the dynamics of towed arrays in water or other towed bodies in air.

SUMMARY OF THE INVENTION

Accordingly, it is an object of the present invention to provide a method for determining inner and outer boundary layer length scales.

It is another object of the present invention to provide a method for determining inner and outer boundary layer length scales from a succession of drag measurements of a long thin cylindrical body.

It is still another object of the present invention to provide a method for determining inner and outer boundary layer length scales of a long thin cylindrical body in order to estimate flow noise and for improved computational modeling of the dynamics of towed arrays in water.

In accordance with the stated objects, a method is provided for determining the local inner and outer turbulent boundary layer length scales from experimental measurements of the drag on a long thin cylindrical body at low or high momentum thickness Reynolds numbers. A succession of measurements of the total drag on a cylinder under tow is taken for particular conditions (flow speed, fluid density, fluid viscosity, cylindrical body geometry). After each measurement the cylinder is truncated by a fixed amount, and the process is repeated for the entire length of the cylinder. The collective measurements provide a spatially and temporally averaged measure of the mean wall shear stress and momentum thickness, from which the inner and outer length scales can be determined directly, for each separate segment of the cylinder. The inner and outer boundary layer length scales may then be used for estimation of flow noise on long thin cylinders, and in particular, current and next generation towed sonar arrays. In particular, this method also allows the spatial variation of the length scales down the length of the cylinder to be determined directly.

The present invention reduces the time and overhead required to produce the accurate flow data needed for proper engineering of towed sonar arrays.

DETAILED DESCRIPTION OF THE PREFERRED EMBODIMENTS

The present invention is a method for determining inner and outer boundary layer length scales from a succession of drag measurements of a long thin cylindrical body in any fluid as a precursor to estimating drag and flow noise.

The methodology begins by towing a unit under test (UUT), preferably a long thin neutrally buoyant cylinder 10, in a controlled environment such as a towing tank, or from a surface platform under conditions for which the ambient flow field is known.

Figure 1:
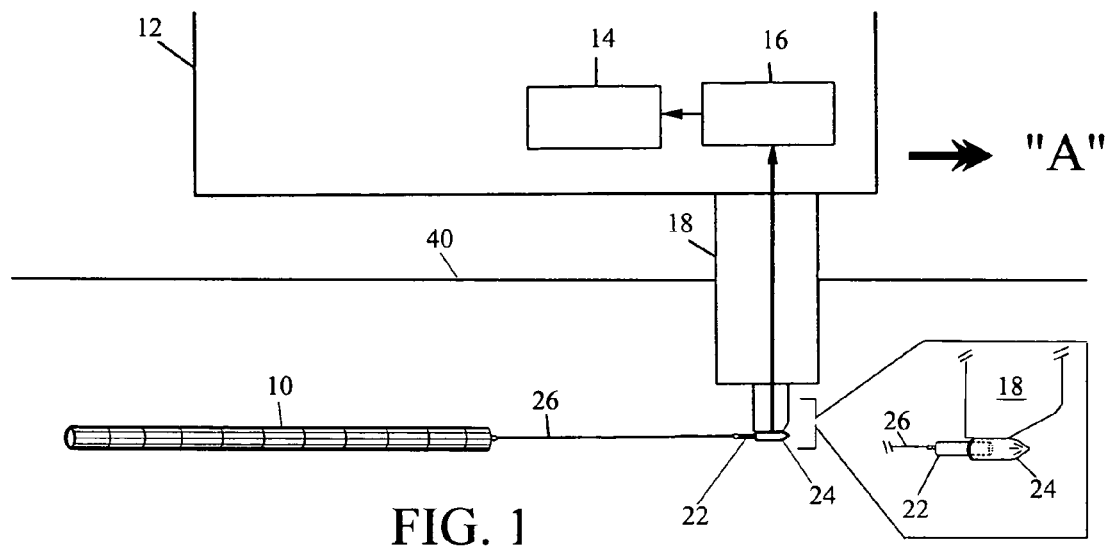
FIG. 1 is a schematic drawing illustrating the towing configuration and load cell used in accordance with the present method.

FIG. 1 is a schematic drawing illustrating the requisite towing configuration, which includes a movable vehicle capable of towing the UUT 10. The vehicle may be any air or sea vessel or, as illustrated in FIG. 1, a movable tow platform 12 capable of towing the UUT 10 in the illustrated tow direction "A" through a fluid medium 40 (here illustrated as water). In the illustrated embodiment the tow carriage 12 is mounted over a tow tank. A processor 14 such as a conventional laptop computer is supplied, here on the tow carriage 12, and is coupled for data transmission (by RS-232, USB port or otherwise) to a load cell computer interface 16. One skilled in the art will recognize that the processor 14 may be any suitable computer located on-site or in remote communication with the load cell computer interface 16.

The load cell computer interface 16 may be a conventional multi-meter as will be described or any other interface capable of digitizing the analog voltage signal produced by a load cell 22. A conventional fixed tow strut 18 extends beneath the tow carriage 12 into the fluid medium 40. The load cell 22 is mounted distally on the tow strut 18 behind a common fairing 24 which minimizes the generation of turbulence. The load cell 22 may be any common type of tensile load measuring device, such as a strain gage load cell. An axial type load cell usually consists of a hollow or solid cylindrical shaft and four strain gages mounted around the circumference.

The strain gages are mounted and connected to form a Wheatstone bridge circuit. The load cell 22 is tethered by a leader line 26 to the UUT 10, which is depicted as a small diameter cylinder. The leader line 26 separates the UUT 10 from any turbulence generated by the tow strut 18.

In practicing the method of the invention, the UUT 10 is towed and the total drag on the towed cylinder is measured directly by the load cell 22, which outputs an analog signal that is digitized by the load cell computer interface 16. The digitized load is processed using a control volume analysis extended to the case of axisymmetric flows to exactly calculate the momentum thickness (which is the outer length scale) of the turbulent boundary layer at the end of the cylinder UUT 10.

A suitable control volume analysis is detailed below in reference to FIGS. 2 and 3. This calculation requires the angle of tow of the UUT 10 to be within one degree, and the tow speed $U_o$ to be steady temporally.

Next, a fixed-length segment of the UUT 10 is removed from its trailing end, and the total drag on the towed cylinder is measured directly as described above by the load cell 22, and the control volume analysis of axisymmetric flow is repeated to calculate the momentum thickness of the truncated cylinder UUT.

The foregoing procedure is repeated successively, with a fixed segment of the cylinder UUT 10 being removed for each drag measurement. A typical UUT segment length to remove is approximately 1 m, but could be larger or smaller, depending on the desired spatial resolution. The foregoing procedure is repeated for the entire length of the UUT 10.

It can be seen that the difference in drag between consecutive measurements yields the spatially and temporally averaged mean wall shear that exists on each particular segment. By repeating this procedure over the entire length of the UUT 10, the spatial dependence of the mean wall shear stress is determined, as well as the spatial dependence of the momentum thickness.

Figure 2:
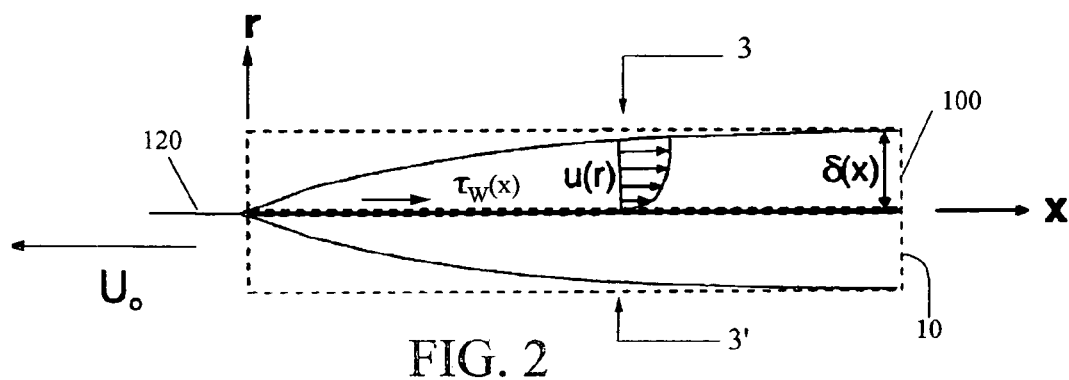
FIG. 2 is a diagram of the control volume for cylindrical coordinates based on a side view of a tested cylinder.

FIG. 2 is a diagram of the control volume for cylindrical coordinates. A standard control volume analysis is applied in which the following notations are used.

a cylinder radius (ft)
u(r) temporal mean streamwise velocity at radial location r (ft/sec)
r radial distance from the center of the cylinder (ft)
x streamwise distance from the leading edge of the cylinder (ft)
$U_o$ tow speed of the cylinder (ft/sec)
CS control surface of the control volume (ft²)
dA incremental annular surface area at the end of the control volume (ft²)
F vector force applied to the surface of the control volume (lbf)
F streamwise scalar force applied to the surface of the control volume (lbf)
$A_s$ total surface area of the cylinder (ft²)
$A_2$ annular surface area at the end of the control volume (ft²)
L length of the cylinder (ft)
$C_d$ tangential drag coefficient (nondimensional)
s boundary layer inner length scale (ft)
ν kinematic viscosity of the fluid (ft²/sec)
$\mu_\tau$ friction velocity (ft/sec)
$\tau_w$ temporally averaged mean wall shear stress (psf)
$\tau_{ave}$ spatially and temporally averaged mean wall shear stress (psf)
ρ fluid density (slugs/ft³)
δ boundary layer thickness at the end of the cylinder (ft)
boundary layer momentum thickness at the end of the cylinder (ft)
∇ temporal mean velocity vector (ft/sec)
d connotes the derivative of the associated term The outer boundary layer length scale is the momentum thickness 100 itself, and the inner boundary layer length scale is given by $\nu/\mu_\tau$, where $\mu_\tau = (\tau_w/\rho)^{1/2}$.

Figure 3:
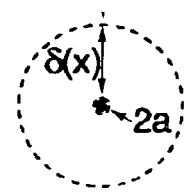
FIG. 3 is an end view of the control volume for cylindrical coordinates from the view of reference line 3—3 of FIG. 2.

Using cylindrical coordinates, as shown in FIGS. 2 and 3, an expression for the momentum thickness 100 is derived. For convenience, the radius of the cylindrical control volume is chosen to be equal to the value of the boundary layer thickness 6 at the end of the cylinder, and the length is the total length of the cylinder or UUT 10. The origin is the centerline 120 of the cylinder, such that the surface of the cylinder is at r=a. In the following analysis, all quantities represent the temporal mean values. We first present an expression defining the momentum thickness θ for this case. Equating the momentum flux through an annulus in the free stream, to the momentum flux defect in the boundary layer, leads to $$\theta^2 + 2a\theta = 2\int_a^{\delta+a} \frac{u(r)}{U_o}\left(1 - \frac{u(r)}{U_o}\right) r\, dr \qquad (1)$$

which again can only be evaluated for θ if u(r) the mean streamwise velocity in the boundary layer is known. However, the momentum thickness may also be derived using a control volume analysis. A cylindrical control volume is used, as shown in FIG. 2, and steady-state conditions are imposed. Conservation of mass for the control volume yields $$\int_{CS} \rho \overline{V}(r, \theta, x) \cdot d\overline{A} = 0 \quad (2)$$

where vector $\overline{V}$ is the temporal mean velocity at the location of the control volume surfaces. Conservation of momentum applied to the control volume can be written as $$\int_{CS} \overline{V} \rho \overline{V} \cdot d\overline{A} = \sum F \quad (3)$$

Note that the only applied force F on the cylindrical control volume of fluid is the shear force at the wall of the cylinder. This force is equal to the streamwise component of the mean wall shear stress averaged over the surface area of the entire cylinder multiplied by the total surface area $A_s = 2\pi a L$. Evaluating the integral at each control surface, and making use of equation (2), yields $$\frac{\tau_{ave} A_s}{\rho U_o^2} = \int_{A_2} \frac{u(r)}{U_o} \left(1 - \frac{u(r)}{U_o}\right) dA \quad (4)$$

where $dA = rdrd\theta$. The quantity $\tau_{ave}$ which is inferred from the drag measurements, is related to the spatially varying wall shear stress through the relation $$\tau_{ave} = \frac{1}{L} \int_0^L \tau_W(x) dx \quad (5)$$

Equation (4) can be simplified to $$\frac{\tau_{ave}}{\rho U_o^2} = \frac{1}{L} \int_a^{a+\delta} \frac{u(r)}{U_o} \left(1 - \frac{u(r)}{U_o}\right) \frac{r}{a} dr = \frac{1}{2} C_d \quad (6)$$

where $C_d$ is the total tangential drag coefficient over the cylinder length L.

Thus, from the measured quantity $C_d$, equation (6) can be solved for the temporally and spatially averaged mean wall shear stress $\tau_{ave}$ existing on each segment of the cylindrical body. From $\tau_{ave}$, the inner boundary layer length scale s can be directly determined.

Using equation (1) for the definition of momentum thickness in conjunction with the control volume analysis, the following relationship is obtained between θ evaluated at x=L and $C_d$ for the case of a cylinder in a steady, uniform flow:

$$\theta_2 + 2a\theta - aLC_d = 0 \quad (7)$$

The outer boundary layer length scale is the momentum thickness θ itself, which is determined directly from equation (7), with the measured value of $C_d$ known.

Thus, we now have an accurate determination of the inner and outer boundary layer length scales s and θ (the inner viscous length scale and the outer boundary layer momentum thickness scale), which are generally recognized as adequately characterizing the flow. The calculations are derived very simply from a succession of drag measurements of a long thin cylindrical body. The calculations may then be used for the estimation of flow noise and improved computational modeling of the dynamics of towed bodies in fluids such as air or water. This greatly reduces the time and overhead required to produce the accurate flow data needed for proper engineering of towed sonar arrays.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the following claims.

What is claimed is:

1. A method for determining inner and outer boundary layer length scales of a cylindrical body, said method comprising the steps of:
   providing a vehicle including a tow strut extendable into a fluid medium, a load cell mounted on the tow strut for measuring strain and outputting an analog voltage signal, and a computer interface for digitizing the analog voltage signal and for transmitting the signal to a host computer;
   attaching the cylindrical body by a tether to the load cell of the vehicle for towing the cylindrical body through the fluid medium;
   towing the cylindrical body with the vehicle at a predetermined speed;
   measuring a total drag on the cylindrical body with the load cell;
   truncating the cylindrical body at a non-attached end by a fixed segment;
   repeating said towing, measuring and truncating steps over a majority of a length of the cylindrical body;
   determining a difference in total drag between consecutive measurements to derive a spatially and temporally averaged mean wall shear existing on each segment of the cylindrical body; and
   calculating inner and outer boundary layer length scales from said mean wall shear derivation.

2. The method according to claim 1, wherein said determining step further comprises processing said measurements using a control volume analysis adapted for axisymmetric flows.

3. The method according to claim 1, further comprising a step of compiling the differences in total drag between consecutive measurements to calculate a spatially and temporally averaged mean wall shear existing on each segment of the cylindrical body.

4. The method according to claim 3, wherein said step of compiling the differences further comprises using a control volume analysis adapted for axisymmetric flows to calculate an outer length scale of a turbulent boundary layer at an end of the cylindrical body.

5. A method for determining inner and outer boundary layer length scales of a cylindrical body, said method comprising the steps of:
- providing a tow assembly of a movable tow carriage for towing the cylindrical body through a fluid medium, a tow strut extendable from the tow carriage into the fluid medium, a load cell mounted distally on the tow strut for measuring strain and outputting an analog voltage signal, and a computer interface for digitizing the analog voltage signal and for transmitting the signal to a host computer;
- attaching the cylindrical body by a tether to a tow assembly;
- towing the cylindrical body with the tow carriage at a predetermined speed;
- measuring a total drag on the cylindrical body with the load cell;
- truncating the cylindrical body at a non-attached end by a fixed length;
- repeating said towing, measuring and truncating steps over a majority of a length of said cylindrical body;
- determining a difference in total drag between consecutive measurements to derive a spatially and temporally averaged mean wall shear existing on each segment of the cylindrical body; and
- calculating inner and outer boundary layer length scales from said mean wall shear derivation.

6. The method according to claim 5, wherein said determining step further comprises processing said measurements using a control volume analysis adapted for axisymmetric flows.

7. The method according to claim 5, further comprising a step of compiling the differences in total drag between consecutive measurements to calculate a spatially and temporally averaged mean wall shear existing on each segment of the cylindrical body.

8. The method according to claim 7, wherein said step of compiling the differences further comprises using a control volume analysis adapted for axisymmetric flows to calculate an outer length scale of a turbulent boundary layer at an end of the cylindrical body.

* * * * *